Dec. 9, 1952     G. C. BECKER     2,620,945
DISCHARGE SPOUT CONSTRUCTION FOR
INSULATED STORAGE CONTAINERS
Filed Dec. 4, 1950                               2 SHEETS—SHEET 2
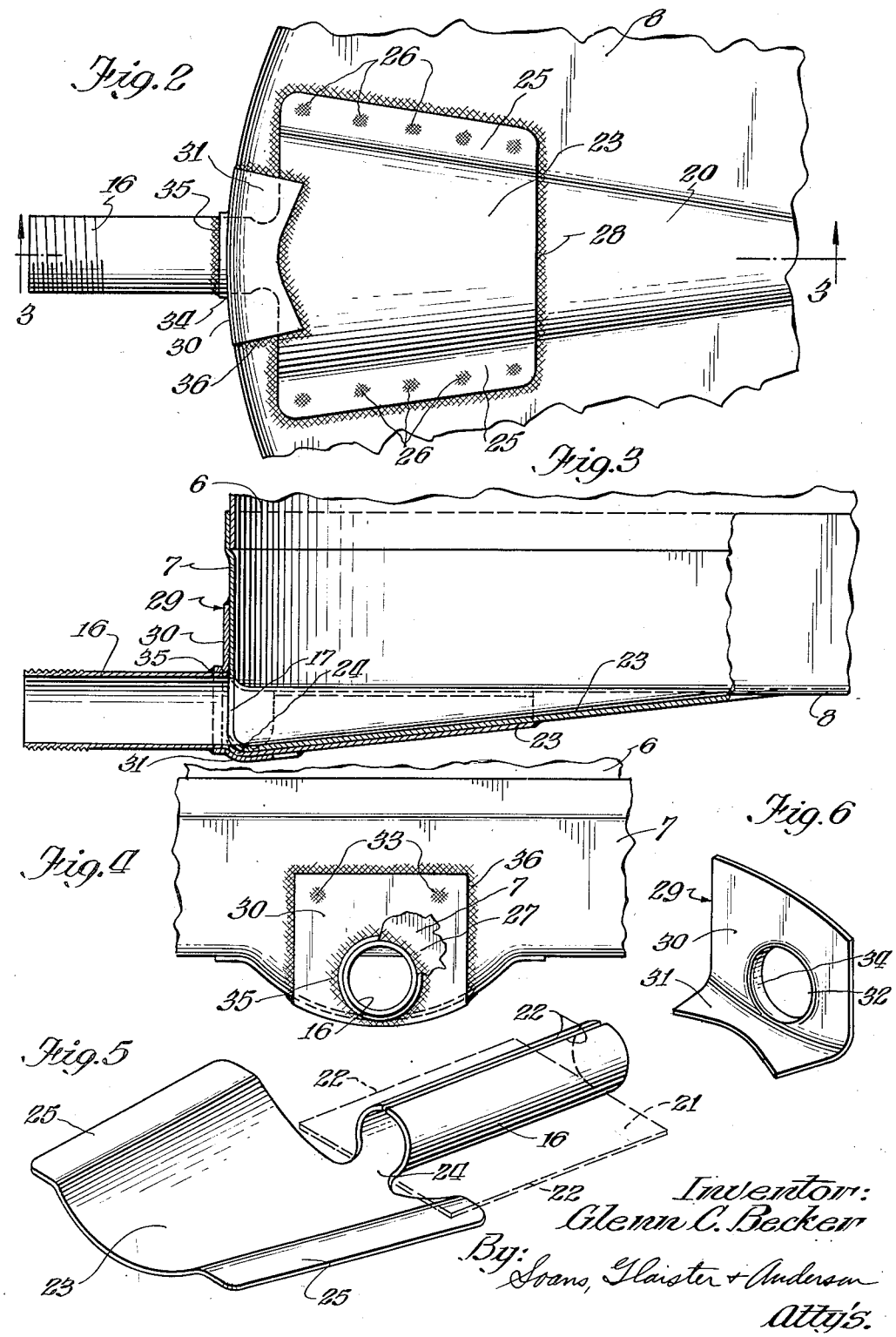
Inventor:
Glenn C. Becker
By: Evans, Glaister + Anderson
Attys.

Patented Dec. 9, 1952

2,620,945

UNITED STATES PATENT OFFICE 2,620,945

DISCHARGE SPOUT CONSTRUCTION FOR INSULATED STORAGE CONTAINERS

Glenn C. Becker, Chicago, Ill., assignor to Vacuum Can Company, Chicago, Ill., a corporation of Illinois Application December 4, 1950, Serial No. 199,086

6 Claims. (Cl. 222—131)

1

This invention relates to storage containers such as are designed for containing beverages and other liquids, and more particularly to the construction of a spout for such containers through which the contents thereof may be withdrawn.

One known type of thermally insulated containers for beverage storage and dispensing purposes embodies an inner container or receptacle and an outer container or jacket which surrounds the inner receptacle in spaced relation thereto to provide an insulating jacket around the inner receptacle. To limit heat loss or heat transmission from or to the inner receptacle direct contact between the outer and inner receptacles is desirably kept to a minimum and the space between the two receptacles is either vacuumized or filled with insulating material. In such thermally insulated container structures, especially when made of sheet metal such as stainless steel, it has been found to be very difficult, if not impossible, to prevent at least slight shifting of the inner container relative to the outer container when the structure is subjected to what must be considered normal handling but which may reasonably be characterized as actually abusive handling, it being understood that containers of the type referred to are frequently employed for dispensing beverages under conditions which more or less preclude careful handling of the containers when moving them from one place to another.

Containers of the kind referred to have of course heretofore seen provided with spouts for draining liquids from them but the constructions heretofore used have proven to be weak and frequently damaged incident to the shifting of the inner container relative to the outer container. Shifting of the inner container relative to the outer container often causes breakage of the joint between a spout tube and the inner container and the repair of such breakage is a costly matter since it usually requires more or less complete disassembly of the container structure and this cannot be practically done if the two shells are welded together to attain a highly durable and leak-proof construction.

The principal object of the present invention is to provide an improved spout construction for containers of the type referred to and more specifically to provide an improved connection between a spout tube and the inner receptacle of a thermally insulated container so as to prevent much of the breakage which has heretofore been experienced.

2

Other objects and advantages of the invention will be understood by reference to the following specification and accompanying drawings (2 sheets) wherein there is illustrated a container embodying a spout construction according to a selected form of the invention.

In the drawings,

Figure 2 is a bottom plan of the spout carrying portion of the inner receptacle;

Figure 3 is a cross section on the line 3—3 of Figure 2;

Figure 4 is an elevational view looking at the end of the spout structure and inner receptacle; and Figure 5 and 6 are perspective illustrations of parts employed in forming the improved spout structure.

Figure 1:
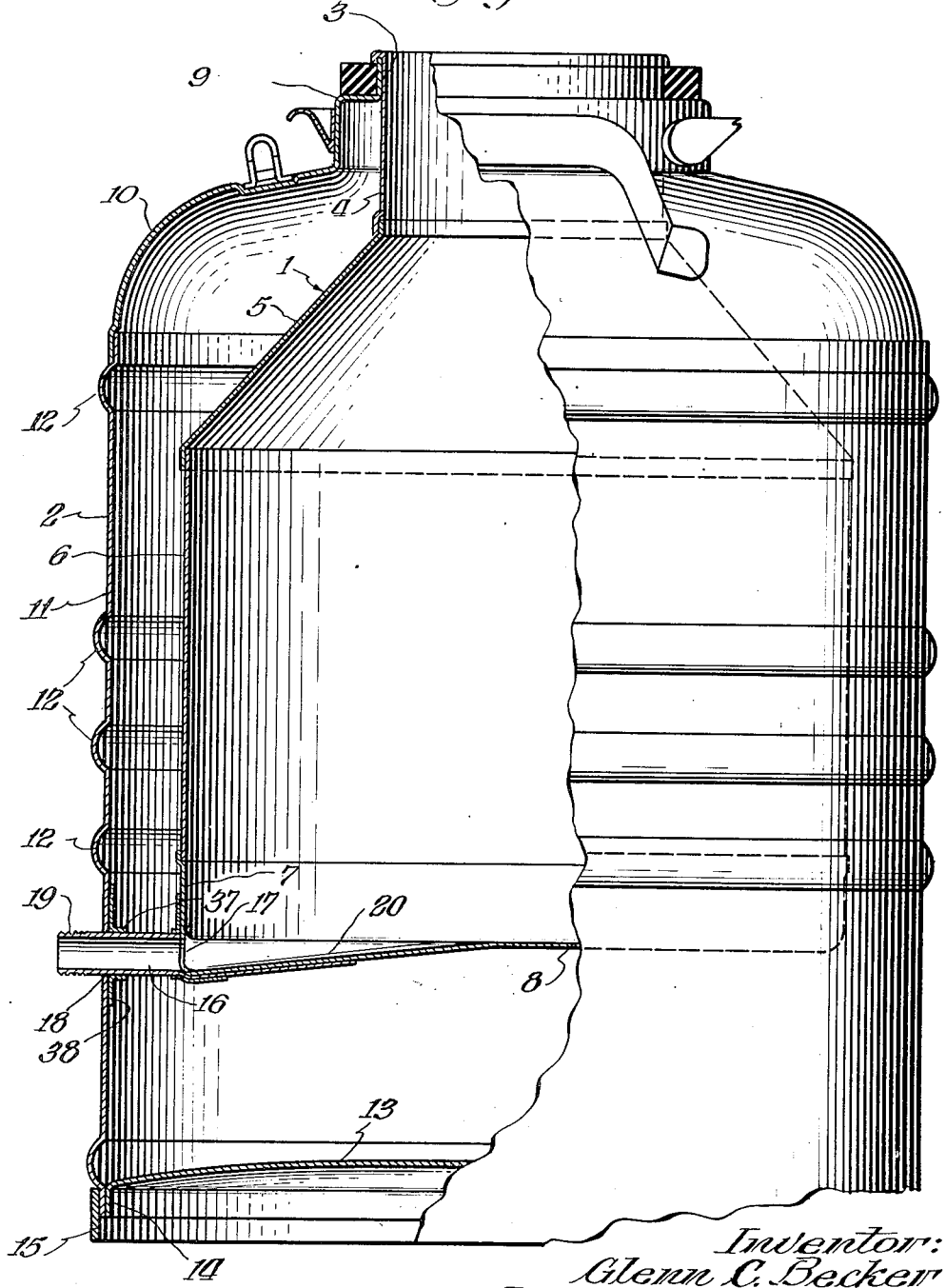
Figure 1 is a side view of a thermally insulated container, part of the view being in elevation and a part in cross section.

The container illustrated in Figure 1 comprises an inner container or receptacle 1 and an outer container or jacket 2. The inner container 1 is supported within the jacket 2 mainly by being suspended from the upper end of the jacket 2 by means of a mouth end connection between the receptacle and jacket as indicated at 3. A suitable cover structure is provided for the receptacle but inasmuch as the details thereof form no part of the present invention, the cover is not herein illustrated.

The inner receptacle 1 comprises a mouth portion 4, a conical shoulder part 5 and a cylindrical body 6, the latter having its lower end closed by a shallow pan-like part having a cylindrical side wall 7 and a bottom wall 8. The parts 4, 5, 6 and 7 are suitably interconnected by welded lap joints or otherwise so that they cooperate to form leak-proof receptacle.

The outer container 2 comprises a suitably formed neck portion 9 which is directly united as indicated at 3 to the upper end of the inner receptacle so as to suspend the inner receptacle from the neck of said jacket. The neck 3 is formed integrally with a convex breast portion 10, the lower end of which is suitably united to a cylindrical body sleeve 11 which may have a series of circumferentially extending strengthening ribs 12 pressed therefrom. The lower end of said body sleeve 11 is closed by an inset bottom member 13 which has a depending cylindrical flange portion 14 welded in face-to-face relation to the lower marginal portion of said body sleeve 11. A protective base ring 15 is also secured to the lower end of the outer container or jacket as shown.

In some instances spacing members are provided between the lower end of the inner receptacle 1 and the side wall of the outer container 2 (for example, as shown in Verheyden Patent 2,510,671, June 6, 1950) to prevent relative shifting of the parts adjacent to the inner end of the inner receptacle, thereby also more or less protecting the discharge spout from damage. Such spacers embody extra parts which necessarily increase the cost and also the weight of the complete container and their elimination is therefore desirable if it can be accomplished without adversely affecting the structure.

A spout tube 16 extends from an opening 17 in the inner receptacle through an opening 18 in the side wall of the outer jacket for facilitating dispensing of liquid from the container. This spout tube 16 may have its outer end threaded as indicated at 19 or otherwise treated to facilitate attachment thereto of a suitable faucet or other valve. To facilitate complete drainage of liquid from the receptacle 1, the spout 16 should of course be located in communication with the lowest point in the receptacle. To that end the bottom wall 8 of the receptacle is preferably provided with a depressed channel 20 which is of relatively narrow width and extends radially from the center of the container to the side wall, the depth and width of said channel being gradually increased from the center of the receptacle to the side wall 7 of said shallow pan-like bottom member. The opening 17 is located in the side wall 7 so as to communicate with the lowermost portion of the channel 20 so that substantially complete drainage of liquid from the receptacle may be effected.

The details of the connection between the spout 16 and the inner receptacle 6 are shown on a somewhat larger scale in Figures 2 to 6 to which attention is now directed.

The spout tube 16 is formed from a sheet metal blank provided with a substantially rectangular portion represented at 21 in broken lines in Figure 5, said portion being bent or rolled to form the said tube, edges 22 of such portion of the blank being brought together as indicated in Figure 5 in a seam extending longitudinally of the tube. The joint formed by these edge portions is sealed preferably by welding, the welding being done in such a manner as to insure complete filling of the gap which occurs between the opposed edges 22. This welding may result in the formation of a slight ridge projecting both outwardly and inwardly of the tube. Any such external ridge is ground off before application of the tube to the receptacle.

A plate portion 23 is integrally connected to one end of the tube 16 through the agency of a neck portion 24 and the plate portion 23 is pressed to a concave form which will snugly fit over the bottom of the channel portion 20 of the receptacle. At the opposite sides of the concave portion 23 there are provided flat marginal flanges or ledges 25 which will fit face-to-face against the bottom wall 8 of the receptacle on opposite sides of the channel portion 20.

The spade shaped spout member shown in Figure 5 is applied to the receptacle bottom by aligning the plate end of the tube 16 with the opening 17 and positioning said plate end of the tube substantially in abutment with the side wall 7 around said opening 17 and the bottom plate 23 in face-to-face engagement with the bottom of the channel portion 20 of the receptacle bottom. The spade member may conveniently be secured in its assembled relation to the container structure by a series of spot welds or the like indicated at 26 which unite the flange portions 25 directly to the bottom wall 8 of the receptacle. The joint between the plate end of the tube 16 and the side wall 7 of the receptacle around the opening 17 and the joint between the plate and flange portions 23 and 25 respectively and the bottom of the receptacle is silver soldered or similarly bonded as indicated at 27 and 28, respectively, such bonding serving to cooperate with the spot welding to rigidly hold the tube in place on the receptacle bottom structure and to seal the joints between these parts.

As best shown in Figures 3 and 5, the neck portion 24 of the spout spade has an offset which extends downwardly from the bottom portion of the tube 16 so that the bottom portion of the wall of the tube 16 is located in co-planar relation to the lowermost wall portion of the channel part 20 of the receptacle bottom. Hence, the spout 16 will be capable of completely draining the receptacle of any liquid content.

To further strengthen the connection between the spout 16 and the receptacle bottom structure there is provided a hanger member 29 which embodies a side plate portion 30 and a bottom ledge portion 31, the side plate portion 30 being provided with an outwardly flanged opening 32 of a size to snugly fit around the tube 16. This hanger 29 is slipped over the tube 16 after the latter is fastened in place on the receptacle as already described, the side plate portion 30 of the hanger being brought into face-to-face engagement with the side wall 7 of the receptacle bottom structure. The bottom flange or ledge 31 of the hanger is arranged to fit substantially in face-to-face engagement to the underside of the adjacent marginal portion of the plate 23 of the spout member. The hanger 29 is initially secured in its assembled relation to the other parts by spot welding the plate 30 to the wall 7 as indicated at 33. With the hanger so held in place, its attachment to the other parts is strengthened by silver soldering or similarly bonding the flange 34 to the spout 16 as indicated at 35 and the plate 30 and ledge 31 to the adjacent portions of the receptacle as indicated at 36. While it is desirable that the silver soldering unite the hanger portions 30 and 31 (and also the spout plate portions 23 and 25), over their entire areas to the adjacent wall portions of the receptacle structure, this is not necessary and an efficient structure is obtained by effecting peripheral soldering as indicated. As best shown in Figure 2 the ledge portion 31 of the hanger extends into lapping relationship to the bottom plate 23 of the spout unit and said silver soldering 36 is of course applied to also unite said ledge 31 to said bottom plate 23 as indicated. Such silver soldering at 36 serves to close any space which may exist between the flange or ledge 31 and the bottom wall 8 of the receptacle incident to seating of said ledge 31 on the bottom of the plate 23.

Silver soldering is employed because it is effective to unite parts made of stainless steel which is preferably used in forming the described structure. Such silver soldering is also advantageous because it provides a very strong joint which, in the arrangement illustrated, cannot be easily broken.

After the hanger 29 is applied as explained the tube 16 is subjected to a reaming operation which removes any internal rib formation incident to the closing of the joint between the edges 22.

The reamer is driven inwardly through the tube 16 until it extends at least a short distance beyond the inside of the side wall 7 of the receptacle bottom unit to thereby insure formation of a continuous bottom level extending from the channel 20 into the tube 16 for complete liquid drainage purposes. The joint between the tube 16 and the receptacle side wall 7 on the inside of the receptacle is next tinned, i. e., coated with tin or some other suitable protective coating which has no contaminating or other undesirable effect on liquids which are dispensed from the container and will prevent contact between any liquid content in the receptacle and the silver soldering or other bonding at the joint around the opening 17. Such tinning in addition to providing a protective coating will also serve to fill in and smooth out any crevice which may possibly remain incident to the formation of the joint between the tube 16 and the receptacle bottom structure.

The outer end of the spout 16 may be soldered or otherwise secured to the side wall of the container jacket 2. In this instance there is shown (Figure 1) a flanged collar 37 seated on the tube 16 with its flange 38 disposed against the inside of the jacket wall 11. This collar may be welded, soldered, or otherwise secured in fixed place on the tube 16 and left unattached to the wall 2 so as to serve merely as a spacer but it is usually preferable to secure the flange 38 by spot welding or otherwise to the jacket wall 11, such fastening being effected while access may be had to the collar and flange 37 and 38 before the bottom member 13 is applied to the structure.

It has been found that a spout structure made and secured as above described strongly resists breakage of the joint between the spout and the inner receptacle incident to causes such as first above mentioned. The details of attachment and the formation of the parts are quite simple and not objectionably costly for a device of the character described. The required parts may be economically made by sheet metal stamping and forming operation and the dies needed therefor are small and simple in construction so as to be relatively low in cost, whereby the described construction is well within the capacities of smaller manufacturers in respect of both cost and require manufacturing equipment.

Various changes may be made in the described construction while retaining the principles thereof.

I claim:

1. A spout construction for a sheet metal receptacle embodying a bottom wall and a side wall having an opening therethrough adjacent said bottom wall, comprising a sheet metal member formed into a spade having a tube and a bottom plate extending from one end of said tube, said tube being axially aligned with said opening and the plate end of said tube substantially abutting said receptacle wall around the opening therein, said bottom plate underlying the bottom of said receptacle and being attached thereto at one or more selected points so as to fixedly position said spade relative to said receptacle and at least the peripheral portions of the joints between said tube and plate and said receptacle being continuously bonded together to additionally secure said spade to said receptacle and to seal said joints against leakage, and a hanger having a side plate apertured to receive said tube and a ledge extending laterally from the lower edge of said side plate, said side plate being disposed in face-to-face relation to the side wall of said receptacle with said tube projecting through said aperture, and said ledge being disposed in underlying relationship to said bottom wall and bottom plate, said side plate of the hanger being attached at one or more selected points to said side wall to fixedly position said hanger relative to the receptacle and at least the peripheral portions of the joints between said hanger and said side and bottom walls, said bottom plate and said tube, being continuously bonded together to additionally secure said parts rigidly in fixed relation and to seal said joints.

2. A spout construction for a sheet metal receptacle embodying a bottom wall and a side wall having an opening therethrough adjacent said bottom wall, comprising a sheet metal member formed into a spade having a tube and a bottom plate extending from one end of said tube, said tube being axially aligned with said opening, the plate end of said tube substantially abutting said receptacle wall around the opening therein and said bottom plate underlying the bottom of said receptacle and being spot welded thereto so as to fixedly position said spade relative to said receptacle, and at least the peripheral portions of the joints between said tube and plate and said receptacle being silver soldered to additionally secure said spade to said receptacle and to seal said joints against leakage, and a hanger having a side plate apertured to receive said tube and a ledge extending laterally from the lower edge of said side plate, said side plate of the hanger being disposed in face-to-face relation to the side wall of said receptacle with said tube projecting through said aperture, and said ledge being disposed in underlying relation to said bottom wall and bottom plate, said side plate of the hanger being spot welded to said side wall to fixedly position said hanger relative to the receptacle and at least the peripheral portions of the joints between said hanger and said side and bottom walls, said bottom plate and said tube being silver soldered to additionally secure said parts rigidly in fixed relation and to seal said joints.

3. A spout construction for a sheet metal receptacle embodying a bottom wall and a side wall having an opening therethrough adjacent said bottom wall, comprising a sheet metal member formed into a spade having a tube and a bottom plate extending from one end of said tube, said tube having a seam extending longitudinally thereof joining edges of the portion of the sheet metal member which are brought together incident to the forming of said portion into said tube, said tube being axially aligned with said opening and the plate end of said tube substantially abutting said receptable wall around the opening therein, said bottom plate underlying the bottom of said receptacle and being attached thereto at one or more selected points so as to fixedly position said spade relative to said receptacle and at least the peripheral portions of the joints between said tube and plate and said receptacle being continuously bonded together to additionally secure said spade to said receptacle and to seal said joints against leakage, and a hanger having a side plate apertured to receive said tube and a ledge extending laterally from the lower edge of said side plate, said side plate being disposed in face-to-face relation to the side wall of said receptacle with said tube projecting through said aperture, and said ledge being disposed in underlying relationship to said bottom wall and said bottom plate, said side plate of the hanger being attached at one or more selected points to said side wall to fixedly position said hanger relative to the receptacle and at least the peripheral portions of the joints between said hanger and said side and bottom walls, said bottom plate and said tube, being continuously bonded together to additionally secure said parts rigidly in fixed relation and to seal said joints.

4. A spout construction for a sheet metal receptacle embodying bottom and side walls, the side wall having an opening therethrough located so as to have its lowermost peripheral portion substantially in the plane of the inside of said bottom wall, comprising a spade formed of sheet metal and having a tube and a bottom plate extending from one end of said tube, said tube having a joint extending longitudinally thereof between edges of the portions of the sheet which are brought together incident to the forming of said portion into said tube, said longitudinal joint being sealed against leakage and said tube being axially aligned with said opening, the plate end of said tube substantially abutting said receptacle wall around said opening and said bottom plate being offset downwardly from the bottom portion of said tube by a distance approximating the thickness of said bottom wall and underlying the latter, said bottom plate being attached at selected points to said bottom wall so as to hold the spade in fixed position relative to said receptacle and at least the peripheral portions of the joints between said tube and plate and side receptacle being continuously bonded to additionally secure said spade to said receptacle and to seal said joints against leakage, a sheet metal hanger having a side plate apertured to receive said tube and having a ledge extending laterally from the lower edge of said side plate, said side plate being disposed in face-to-face relation to the side wall of said receptacle with said tube projecting through said aperture, said ledge being disposed in underlying relationship to said bottom wall and said bottom plate, said side plate being attached at selected points to said side wall to fixedly position said hanger relative to the receptacle and at least the peripheral portions of the joints between said hanger and said side and bottom walls, said bottom plate and said tube, being continuously bonded to additionally secure said parts rigidly in fixed relation and to seal said joints, the bore of said tube having been reamed out and the reamed bore extended beyond the plate end of said tube into the bottom of said receptacle so as to provide a continuation of the lower portion of the interior wall of the tube into the bottom wall of the receptacle, thereby to insure free flow and complete drainage of liquid from said receptacle through said spout.

5. A spout construction for a receptacle embodying stainless steel bottom and side walls, the side wall having an opening therethrough located so as to have its lowermost peripheral portion substantially in the plane of the inside of said bottom wall, comprising a spade formed of stainless steel sheet metal and having a tube and a bottom plate extending from one end of said tube, said tube having a joint extending longitudinally thereof between edges of the portions of the sheet metal which are brought together incident to the forming of said portion into said tube and said joint being weld seamed, said tube being axially aligned with said opening, the plate end of said tube substantially abutting said receptacle wall around said opening and said bottom plate being offset downwardly from the bottom portion of said tube by a distance approximating the thickness of said bottom wall and underlying the latter, said bottom plate being spot welded to said bottom wall so as to hold the spade in fixed position relative to said receptacle and at least the peripheral portions of the joints between said tube and plate and side receptacle being silver soldered to additionally secure said spade to said receptacle and to seal said joints against leakage, a stainless steel sheet metal hanger having a side plate apertured to receive said tube and having a ledge extending laterally from the lower edge of said side plate, said side plate being disposed in face-to-face relation to the side wall of said receptacle with said tube projecting through said aperture, said ledge being disposed in underlying relationship to said bottom wall and said bottom plate, said side plate being spot welded to said side wall to fixedly position said hanger relative to the receptacle and at least the peripheral portions of the joints between said hanger and said side and bottom walls, said bottom plate and said tube, being silver soldered to additionally secure said parts rigidly in fixed relation and to seal said joints, the bore of said tube having been reamed out and the reamed bore extended beyond the plate end of said tube into the bottom of said receptacle so as to provide a continuation of the lower portion of the interior wall of the tube into the bottom wall of the receptacle, thereby to insure free flow and complete drainage of liquid from said receptacle through said spout, and the inside surfaces of the joints between said tube and said receptacle being tinned or otherwise protectively coated so as to prevent contact of the material introduced into said container with the silver soldering at said joints.

6. In a container embodying a jacket and a receptacle supported within said jacket in spaced relation thereto, a spout extending from the lower end portion of said receptacle to said jacket for facilitating withdrawal of liquids from said receptacle, said spout comprising a sheet metal member formed into a spade having a tube and a bottom plate extending from one end of said tube, said tube having a seam extending longitudinally thereof joining edges of the portion of the sheet metal member which are brought together incident to the forming of said portion into said tube, said tube being axially aligned with an opening provided in the side wall of said receptacle adjacent the bottom thereof and with an opening provided in the side wall of said jacket, the plate end of said tube substantially abutting said receptacle wall around the opening therein and said bottom plate underlying the bottom of said receptacle and being attached thereto at one or more selected points so as to fixedly position said spade relative to said receptacle, at least the peripheral portions of the joints between said tube and plate and said receptacle being continuously bonded to additionally secure said spade to said receptacle and to seal said joints against leakage, and a hanger having a side plate apertured to receive said tube and a ledge extending laterally from the lower edge of said plate, said plate of the hanger being disposed in face-to-face relation to the side wall of said receptacle with said tube projecting through said aperture, and said ledge being disposed in underlying relationship to said bottom wall and said bottom plate, said side plate being attached at selected points to said side wall to fixedly position said hanger relative to the receptacle and at least the peripheral portions of the joints between said hanger and said side and bottom walls, said bottom plate and said tube, being continuously bonded to additionally secure said parts rigidly in fixed relation and to seal said joints, and means securing the other end of said tube to said jacket.

GLENN C. BECKER.

REFERENCES CITED

The following references are of record in the file of this patent:

UNITED STATES PATENTS

| Number | Name | Date |
| --- | --- | --- |
| 351,848 | Brown | Nov. 2, 1886 |
| 1,707,172 | Nathanson | Mar. 26, 1929 |
| 1,965,877 | Bost | July 10, 1934 |